(12) United States Patent
Yamaga et al.

(10) Patent No.: US 11,346,272 B2
(45) Date of Patent: May 31, 2022

(54) COOLING SYSTEM AND COOLING METHOD

(71) Applicant: Mazda Motor Corporation, Hiroshima (JP)

(72) Inventors: Yuma Yamaga, Aki-gun (JP); Yusuke Koike, Aki-gun (JP); Takafumi Tanehira, Aki-gun (JP); Kanichi Yamaguchi, Aki-gun (JP); Katsutoshi Taninaka, Aki-gun (JP); Yusuke Mikuni, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/159,816

(22) Filed: Jan. 27, 2021

(65) Prior Publication Data
US 2021/0254540 A1 Aug. 19, 2021

(30) Foreign Application Priority Data

Feb. 19, 2020 (JP) .............................. JP2020-026033

(51) Int. Cl.
*F01P 7/14* (2006.01)
*F01P 3/20* (2006.01)
(Continued)

(52) U.S. Cl.
CPC .............. *F01P 7/16* (2013.01); *B60K 11/085* (2013.01); *F01P 3/18* (2013.01); *F01P 11/10* (2013.01);
(Continued)

(58) Field of Classification Search
CPC ........ F01P 3/20; F01P 3/18; F01P 7/14; F01P 11/10; B60K 11/085; B60K 11/02
See application file for complete search history.

(56) References Cited

U.S. PATENT DOCUMENTS 5,609,125 A * 3/1997 Ninomiya .................. F01P 7/08
123/41.12
2008/0283215 A1* 11/2008 Saida .................. B60H 1/00828
165/43

(Continued)

FOREIGN PATENT DOCUMENTS

JP 2015223905 A 12/2015

*Primary Examiner* — Long T Tran
(74) *Attorney, Agent, or Firm* — Alleman Hall Creasman & Tuttle LLP (57) ABSTRACT

A cooling system is provided to cool an engine of a vehicle, which includes a cooling water passage through which cooling water is supplied to a water jacket formed in the engine, and having an undercover cooling water passage provided in an undercover, a radiator provided in the cooling water passage and configured to cool the cooling water by exchanging heat with air flowing into an engine bay from a grille, a flow rate adjuster configured to adjust a cooling water flow rate supplied to the undercover cooling water passage, and a controller configured to acquire a temperature of the cooling water of the water jacket in the engine and, when the temperature is above a temperature threshold, control the flow rate adjuster to increase the flow rate of the cooling water supplied to the undercover cooling water passage compared to when the acquired temperature is below the temperature threshold.

5 Claims, 6 Drawing Sheets

(51) Int. Cl.
*B60K 11/02* (2006.01)
*F01P 7/16* (2006.01)
*F01P 3/18* (2006.01)
*B60K 11/08* (2006.01)
*F01P 11/10* (2006.01)

(52) U.S. Cl.
CPC ..... *F01P 2007/146* (2013.01); *F01P 2050/22* (2013.01)

(56) References Cited

U.S. PATENT DOCUMENTS

| | | | |
|---|---|---|---|
| 2011/0061405 A1* | 3/2011 | Watanabe | B60K 11/085 62/133 |
| 2013/0316634 A1* | 11/2013 | Ajisaka | B60K 11/08 454/152 |
| 2015/0088364 A1* | 3/2015 | Sakayori | F01P 11/16 701/29.7 |
| 2015/0191078 A1* | 7/2015 | Miyaji | B60K 11/085 701/49 |
| 2015/0343894 A1 | 12/2015 | Yoshioka | |
| 2017/0227421 A1* | 8/2017 | Kuhara | G01M 99/00 |
| 2017/0321597 A1* | 11/2017 | Michikawauchi | F01P 3/20 |
| 2018/0259240 A1* | 9/2018 | Onishi | F25D 21/02 |
| 2019/0234291 A1* | 8/2019 | Cunningham | F01P 5/12 |

* cited by examiner

COOLING SYSTEM AND COOLING METHOD

TECHNICAL FIELD

The present disclosure relates to a cooling system which cools an engine of a vehicle, and a method of cooling an engine of a vehicle.

BACKGROUND OF THE DISCLOSURE

Air flows into an engine bay from a grille of a vehicle as the vehicle travels. Although this air can be used to cool cooling water in a radiator, it acts as resistance in traveling of the vehicle and fuel efficiency degrades. For example, JP2015-223905A discloses a grille shutter provided to a grille of a vehicle. When a given condition is met, the grille shutter closes the grille to prevent air from flowing therein and reduce air resistance to the vehicle.

When the grille is enlarged, a flow rate of air into the engine bay is increased, which enhances an effect of cooling the elements of the engine bay described above; however, it leaves a challenge in that the air resistance increases. Recently, achieving a high performance in both cooling the elements of the engine bay and reducing the air resistance has been demanded.

SUMMARY OF THE DISCLOSURE

The present disclosure is made in view of the above situation, and one purpose thereof is to provide a cooling system and a cooling method, which effectively cool an engine of a vehicle, without enlarging a grille of the vehicle.

According to one aspect of the present disclosure, a cooling system configured to cool an engine of a vehicle is provided. The system includes a cooling water passage through which cooling water is supplied to a water jacket formed in the engine, and having an undercover cooling water passage provided in an undercover forming a bottom surface of the vehicle and where the cooling water is cooled by exchanging heat with air below the undercover, a radiator provided in the cooling water passage and configured to cool the cooling water by exchanging heat with air flowing into an engine bay from a grille that is an opening portion formed at a front end of the vehicle, a flow rate adjuster including a pump or valve, configured to adjust a flow rate of the cooling water supplied to the undercover cooling water passage, and a controller configured to control the flow rate adjuster, the controller acquiring a temperature of the cooling water of the water jacket in the engine and, when the acquired temperature is above a temperature threshold, controlling the flow rate adjuster to increase the flow rate of the cooling water supplied to the undercover cooling water passage compared to when the acquired temperature is below the temperature threshold.

In order to cool the cooling water, the configuration described above includes the undercover cooling water passage and the radiator. The undercover cooling water passage is provided to the undercover of the vehicle, and cools the cooling water by exchanging heat between the cooling water and air below the undercover.

Moreover, when the temperature of the cooling water of the water jacket in the engine is above the temperature threshold, the controller controls the flow rate adjuster to increase the flow rate of the cooling water supplied to the undercover cooling water passage compared to when the temperature is below the temperature threshold. Thus, when the temperature of the cooling water of the water jacket in the engine is high, the cooling of the cooling water in the undercover cooling water passage is stimulated. As a result, without increasing the size of the grille, the engine can be effectively cooled.

The cooling system may further include a grille shutter provided to the grille and configured to change an effective opening area of the grille. The undercover cooling water passage may cool the cooling water by exchanging heat with air flowing into the engine bay from the grille and reaching above the undercover. The controller may acquire a traveling speed of the vehicle and, when the traveling speed is below a given first speed threshold, control the grille shutter to increase the effective opening area of the grille compared to when the acquired traveling speed is above the first speed threshold. When the traveling speed of the vehicle decreases, the heat exchange between the cooling water of the undercover cooling water passage and air below the undercover slows down. Thus, the cooling of the cooling water in the undercover cooling water passage cannot be performed sufficiently.

According to this configuration, in addition to the heat exchange with the air below the undercover, the heat exchange with the air flowing into the engine bay from the grille and reaching above the undercover effectively cools the cooling water. Further, when the traveling speed of the vehicle is below the first speed threshold, the controller increases the flow rate of air reached above the undercover by increasing the effective opening area of the grille compared to when the acquired traveling speed is above the first speed threshold. As a result, cooling of the cooling water in the undercover cooling water passage is stimulated, and therefore the engine is effectively cooled.

The cooling water passage may have a bypass passage connecting a branching portion disposed at a position upstream of the radiator and downstream of the undercover cooling water passage, to a merging portion disposed at a position downstream of the radiator and upstream of the engine. The flow rate adjuster may include the valve which is configured to change the flow rate of the cooling water supplied from the branching portion to the bypass passage. When the acquired traveling speed is below the first speed threshold and above a given second speed threshold that is below the first speed threshold, the controller may control the valve to increase the flow rate of the cooling water supplied from the branching portion to the bypass passage compared to when the acquired traveling speed is below the second speed threshold. When the traveling speed of the vehicle is between the first speed threshold and the second speed threshold, the flow rate of the cooling water circulating in the path bypassing the radiator is increased compared to when the traveling speed of the vehicle is below the second speed threshold, the flow rate of the cooling water supplied from the branching portion to the radiator is reduced. Thus, the resistance received by the cooling water is reduced, and therefore the flow rate of the cooling water supplied to the undercover cooling water passage is increased. As a result, the cooling of the cooling water in the undercover cooling water passage is stimulated, and thus the need to cool the cooling water in the radiator decreases. Therefore, the grille shutter reduces the effective opening area of the grille and also reduces air resistance.

According to another aspect of the present disclosure, a method of cooling an engine of a vehicle is provided. The vehicle is mounted thereon with a cooling system having a cooling water passage through which cooling water is supplied to a water jacket formed in the engine, and having an undercover cooling water passage provided in an undercover forming a bottom surface of the vehicle and where the cooling water is cooled by exchanging heat with air below the undercover, and a radiator provided in the cooling water passage and configured to cool the cooling water by exchanging heat with air flowing into an engine bay from a grille that is an opening portion formed at a front end of the vehicle. The method includes acquiring a temperature of the cooling water in the water jacket, and increasing, when the acquired temperature is above a given temperature threshold, a flow rate of the cooling water supplied to the undercover cooling water passage compared to when the acquired temperature is below the temperature threshold.

DETAILED DESCRIPTION OF THE DISCLOSURE

Hereinafter, cooling systems 1 and 1A according to embodiments will be described with reference to the accompanying drawings.

First Embodiment

<Vehicle>

Figure 1:
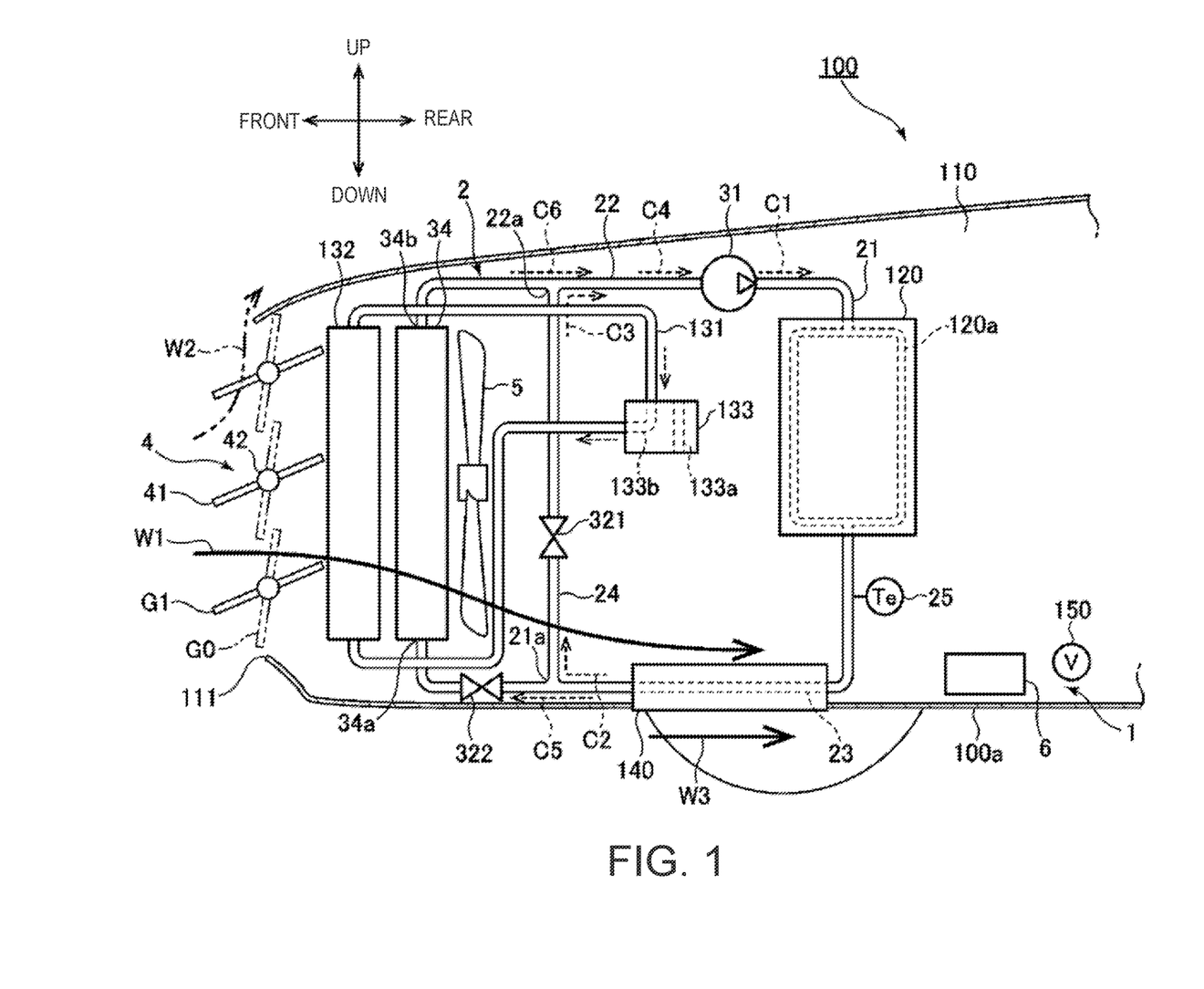
FIG. 1 is a schematic view of a vehicle on which a cooling system according to a first embodiment is mounted.

First, a vehicle 100 equipped with the cooling system 1 according to the first embodiment will be described with reference to FIG. 1. FIG. 1 is a schematic view of the vehicle 100 on which the cooling system 1 is mounted. An engine bay 110 accommodating an engine 120 is formed in a front part of the vehicle 100. An undercover 140 is disposed below the engine 120. The undercover 140 is made of a metal material having a high thermal conductivity (e.g., aluminum). The undercover 140 covers a lower part of the engine bay 110 and forms at least a part of a bottom surface 100a of the vehicle 100.

Here, a direction to which the vehicle 100 travels forward is referred to as "front" and a direction to which the vehicle 100 travels backward is referred to as "rear." Moreover, a vertically upward direction is referred to as "up" and a vertically downward direction is referred to as "down."

<Air Conditioner>

The vehicle 100 is mounted thereon with an air conditioner (not illustrated) which adjusts a temperature inside a cabin. The air conditioner operates using a circulating coolant. For example, the air conditioner has a compressor and an evaporator, and repeats compression, cooling, expansion, and evaporation of the coolant. Air flowing through an outer surface of the evaporator and cooled by exchanging heat with the coolant is supplied to the cabin of the vehicle 100 through a duct (not illustrated).

A cooling water passage 131, a radiator 132, and a condenser 133 are disposed in the engine bay 110 as elements for cooling the coolant used in the air conditioner. The condenser 133 is formed therein with passages 133a and 133b. The cooling water passage 131 allows cooling water to flow through the passage 133b of the condenser 133. When the cooling water passes through the passage 133b, it cools the coolant of the air conditioner flowing through the passage 133a, by exchanging heat therewith.

High-temperature cooling water passed through the passage 133b of the condenser 133 is supplied to the radiator 132 provided in the cooling water passage 131. The radiator 132 has a flat shape and is formed therein with a passage through which the cooling water flows. Further, the radiator 132 is disposed so that its thickness direction is in parallel to the front-and-rear direction.

As the vehicle 100 travels and a radiator fan 5 operates, air flows into the engine bay 110 from a grille 111 as indicated by an arrow W1 in FIG. 1. The air passes through the radiator 132 in its thickness direction. The cooling water flowing inside the radiator 132 is cooled by exchanging heat with this air. The cooling water that passed through the radiator 132 is supplied to the passage 133b of the condenser 133 by the cooling water passage 131 again, and is used for cooling the coolant. Here, the grille 111 is an opening portion formed at a front end of the vehicle 100 to allow air to flow into the engine bay 110.

<Cooling System Configuration>

The engine 120 is an internal combustion engine which generates a drive force of the vehicle 100. The cooling system 1 is mounted on the vehicle 100 to cool the engine 120. In detail, the cooling system 1 is mounted to cool the engine 120 by using the cooling water and maintain the temperature of the engine 120 at a suitable value.

Figure 2:
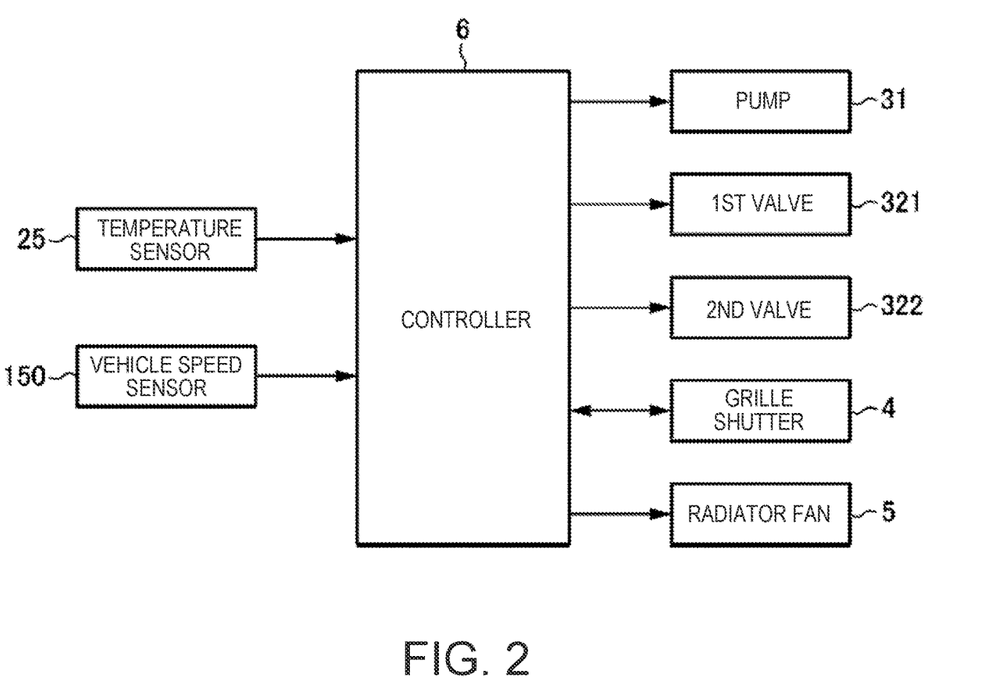
FIG. 2 is a block diagram illustrating a controller.

The configuration of the cooling system 1 is described with reference to FIGS. 1 and 2. FIG. 2 is a block diagram illustrating a controller 6. As illustrated in FIG. 1, the cooling system 1 includes a cooling water passage 2, a grille shutter 4, the radiator fan 5, and the controller 6. Further, the cooling system 1 includes a pump 31 provided in the cooling water passage 2, a first valve 321, a second valve 322, and a radiator 34.

The cooling water passage 2 circulates the cooling water. The cooling water passage 2 has a supply passage 21 and a return passage 22. The supply passage 21 supplies the cooling water discharged by the pump 31 so as to pass through a water jacket 120a formed inside the engine 120 and then to an inlet 34a of the radiator 34. The return passage 22 returns the cooling water flowing out from an outlet 34b of the radiator 34 to the pump 31.

Further, the cooling water passage 2 has an undercover cooling water passage 23 and a bypass passage 24. The undercover cooling water passage 23 is a portion of the supply passage 21 and is formed inside the undercover 140. The bypass passage 24 connects a branching portion 21a provided in the supply passage 21 at a position downstream of the undercover cooling water passage 23, to a merging portion 22a provided in the return passage 22. That is, the bypass passage 24 bypasses the radiator 34 and allows the cooling water to flow from the supply passage 21 to the return passage 22.

A temperature sensor 25 is disposed at a position downstream of the engine 120 and upstream of the undercover cooling water passage 23. The temperature sensor 25 detects a temperature Te of the cooling water. The temperature sensor 25 is disposed near the engine 120. Therefore, the temperature Te of the cooling water detected by the temperature sensor 25 is substantially the same as that of the cooling water of the water jacket 120a in the engine 120.

The pump 31, the first valve 321, and the second valve 322 are one example of a "flow rate adjuster" according to the present disclosure. Further, the first valve 321 and the second valve 322 are one example of a "valve" according to the present disclosure. The pump 31 operates based on a control signal, to pressurize the cooling water and to discharge it downstream. A discharge pressure of the pump 31 is adjustable by changing the control signal. Each of the first and second valves 321 and 322 is an electromagnetic valve which is open when receiving no control signal and closed when receiving the control signal. The first valve 321 is provided in the bypass passage 24, and the second valve 322 is provided in the supply passage 21 at a position downstream of the branching portion 21a.

The radiator 34 has a flat shape and is disposed rearward of the radiator 132 (engine radiator) so that its thickness direction is in parallel to the front-and-rear direction. A passage is formed inside the radiator 34 and the cooling water flows into the passage from the inlet 34a as well as flows out from the outlet 34b.

The grille shutter 4 changes an effective opening area of the grille 111 by changing its opening, and has a plurality of shutter plates 41 and shutter shafts 42. Each of the shutter plates 41 is supported by a corresponding shutter shaft 42 to be swingable between a fully closed position G0 and a fully open position G1. By changing the opening of the grille shutter 4 and changing the effective opening area of the grille 111, a flow rate of the air flowing into the engine bay 110 is changed.

The grille shutter 4 also includes a control unit (not illustrated), a motor (not illustrated), and a link mechanism (not illustrated). The control unit receives a request signal and sets a target position of the shutter plate 41 based on the request signal. Then, the control unit generates a control signal based on the target position and transmits this control signal to the motor.

The motor is a brushless motor. The motor generates a torque based on the control signal received from the control unit and swings one of the plurality of shutter plates 41 with respect to the shutter shaft 42.

The swing movement of the one shutter plate 41 is transmitted to the other shutter plates 41 via the link mechanism. As a result, all the shutter plates 41 are swung in the same direction between the fully closed position G0 and the fully open position G1 and stopped at any position between the fully closed position G0 and the fully open position G1. When the shutter plate 41 is located at the fully closed position G0, a gap between adjacent shutter plates 41 becomes the smallest size, and the effective opening area of the grille 111 becomes the smallest area. When the shutter plate 41 is located at the fully open position G1, the gap between the adjacent shutter plates 41 becomes the largest size, and the effective opening area of the grille 111 becomes the largest area.

The radiator fan 5 is disposed rearward of the radiator 34. When the radiator fan 5 operates based on the control signal, as indicated by the arrow W1 in FIG. 1, air is drawn thereinto via the grille 111 and flows into the engine bay 110.

The controller 6 is an electronic control unit including a processor, memory, etc. As illustrated in FIG. 2, the controller 6 receives detection signals from the temperature sensor 25, a vehicle speed sensor 150, and the control unit (not illustrated) of the grille shutter 4. The controller 6 performs given calculations based on the respective detection signals to acquire information such as the temperature Te of the cooling water at the position downstream of the engine 120 and upstream of the undercover cooling water passage 23, a traveling speed V of the vehicle 100, and whether the grille shutter 4 is in an abnormal state.

The controller 6 performs a given calculation based on the acquired information to generate the control signal and the request signal. The controller 6 controls the respective elements by transmitting the control signal and the request signal to the pump 31, the first valve 321, the second valve 322, the grille shutter 4, and the radiator fan 5.

<Operation of Cooling System>

Figure 3:
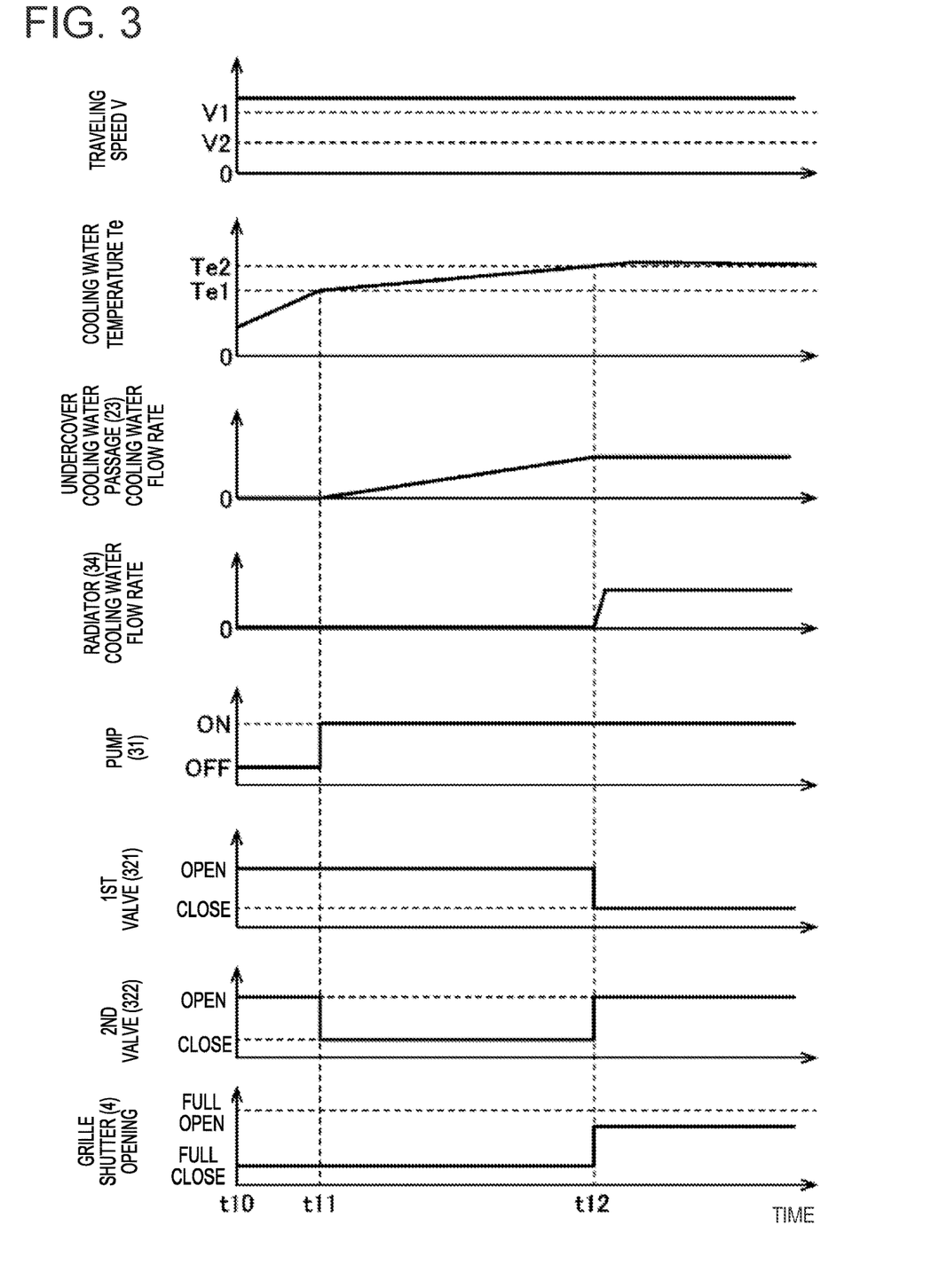
FIG. 3 is a time chart schematically illustrating an operation of the cooling system.
Figure 4:
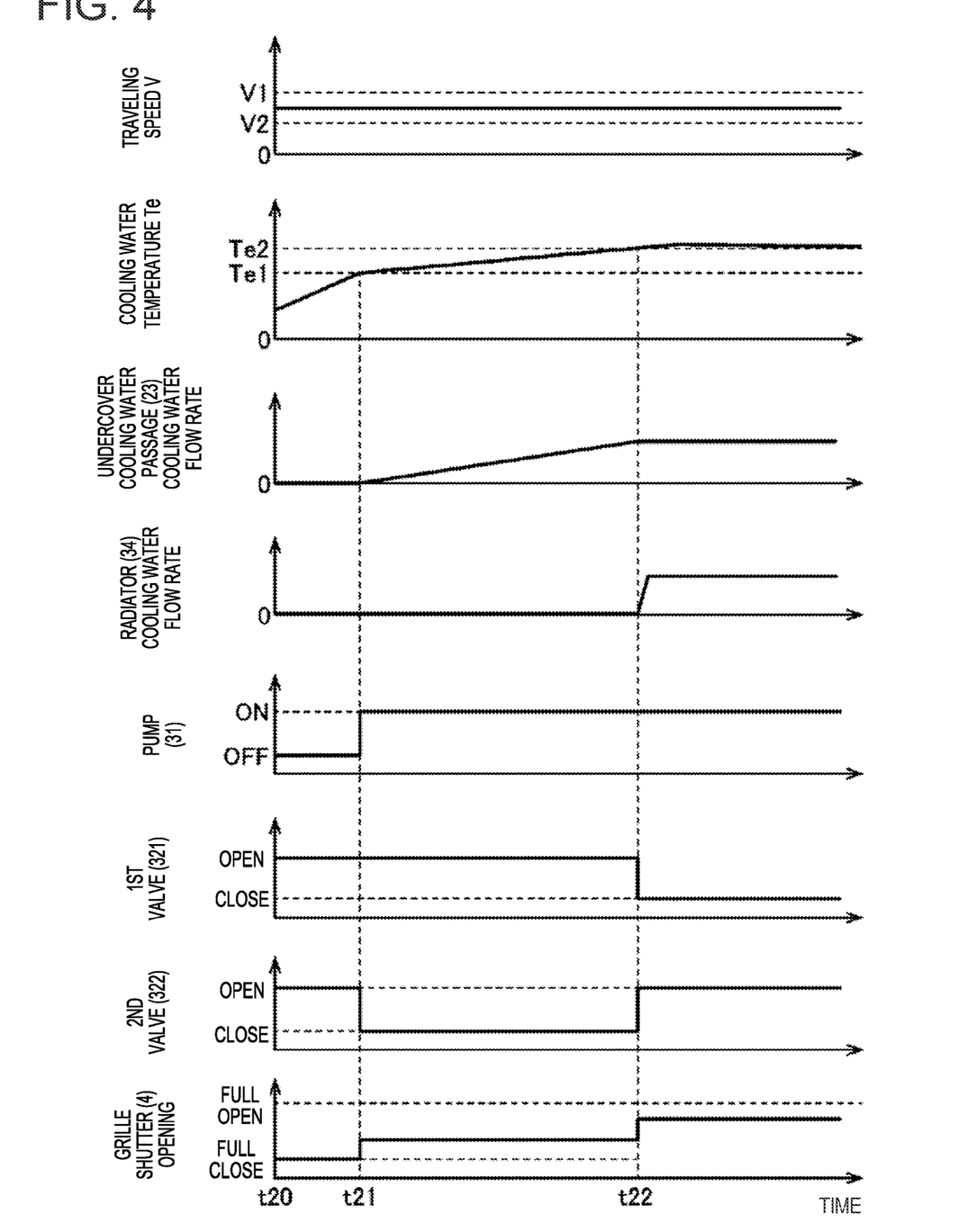
FIG. 4 is a time chart schematically illustrating another operation of the cooling system.

Next, one example of the operation of the cooling system 1 is described with reference to FIGS. 1, 3, and 4. FIGS. 3 and 4 each is a time chart schematically illustrating the operation of the cooling system 1.

FIG. 3 illustrates a state after the traveling speed V of the vehicle 100 becomes constant at a value above a threshold V1 within a short period of time (e.g., one minute) from the start of the engine 120. Here, the threshold V1 is one example of a "first speed threshold" according to the present disclosure.

From a time point t10 to a time point t11, the temperature Te of the cooling water at the position downstream of the engine 120 and upstream of the undercover cooling water passage 23 is below a given threshold Te1. As described above, the temperature Te of the cooling water detected by the temperature sensor 25 is substantially the same as that of the cooling water of the water jacket 120a in the engine 120. The threshold Te1 is one example of a "temperature threshold" according to the present disclosure. Here, the pump 31 does not operate. The controller 6 acquires the temperature Te of the cooling water based on the detection signal received from the temperature sensor 25, and monitors a change thereof. Further, since the controller 6 does not transmit control signals to the first valve 321 and the second valve 322, the first and second valves 321 and 322 are open.

At the time point t11, the pump 31 starts operating upon the rise of the temperature Te of the cooling water above the threshold Te1. Further, the second valve 322 shifts to a closed state while the first valve 321 remains in an open state. As a result, the cooling water is supplied from the branching portion 21a to the bypass passage 24, while the supply of the cooling water from the branching portion 21a to the radiator 34 is prohibited. That is, as illustrated by arrows C1, C2, C3, and C4 in FIG. 1, the cooling water discharged from the pump 31 circulates in a path bypassing the radiator 34.

Further, the shutter plates 41 of the grille shutter 4 are at the fully closed position G0. Thus, as illustrated by an arrow W2 in FIG. 1, the flow of air from the grille 111 to the engine bay 110 is blocked by the shutter plates 41. As a result, it becomes possible to reduce air resistance which the vehicle 100 receives while traveling.

The cooling water discharged from the pump 31 is first supplied to the engine 120 and flows through the water jacket 120a in the engine 120. The cooling water cools the engine 120 by exchanging heat therewith when passing through the water jacket 120a. That is, the cooling water absorbs heat by passing through the engine 120 and rises in temperature.

The cooling water passed through the engine 120 is then supplied to the undercover cooling water passage 23. When the cooling water flows through the undercover cooling water passage 23, it is cooled by exchanging heat with the air below the undercover 140. In detail, as indicated by an arrow W3, the cooling water flowing through the undercover cooling water passage 23 exchanges heat with the air flowing below the undercover 140, through the undercover 140. Here, the undercover 140 functions as a heat radiating plate which dissipates heat from the cooling water to the air.

As described above, from the time point t11, the cooling system 1 supplies the cooling water increased in temperature after passing through the engine 120, to the undercover cooling water passage 23 without supplying it to the radiator 34, and cools the cooling water in the undercover cooling water passage 23. While the temperature of the cooling water is relatively low, the grille 111 is closed to reduce the air resistance, while the cooling water is sufficiently cooled by exchanging heat with the air flowing below the undercover 140. Thus, the rise in the temperature Te of the cooling water becomes slow.

At a time point t12, when the temperature Te exceeds a given threshold Te2, the first valve 321 shifts to the closed state and the second valve 322 shifts to the open state. Here, the threshold Te2 is above the threshold Te1. Thus, the supply of the cooling water from the branching portion 21a to the bypass passage 24 is prohibited, while the supply of the cooling water from the branching portion 21a to the radiator 34 becomes possible. That is, as illustrated by the arrows C1, C5, C6, and C4 in FIG. 1, the cooling water discharged from the pump 31 circulates in a path passing through the radiator 34.

Further, the grille shutter 4 opens the grille 111. The effective opening area of the grille 111 at this time point is determined based on the temperature Te. For example, the effective opening area of the grille 111 becomes larger as the temperature Te increases.

By opening the grille 111, air flows from the grille 111 into the engine bay 110 as illustrated by the arrow W1 in FIG. 1. The air first passes through the radiator 132 in its thickness direction, and then passes through the radiator 34. The cooling water flowing inside the radiator 34 is cooled by exchanging heat with this air. The cooling water passed through the radiator 34 is supplied to the pump 31 again by the return passage 22 of the cooling water passage 2.

As indicated by the arrow W1 in FIG. 1, the air that passed through the radiator 132 and the radiator 34 is supplied to reach above the undercover 140. The cooling water flowing through the undercover cooling water passage 23 is cooled also by exchanging heat with the air reached above the undercover 140. That is, the cooling water flowing through the undercover cooling water passage 23 dissipates heat not only to the air flowing below the undercover 140 but also to the air flowing above the undercover 140.

As described above, from the time point t12, the cooling system 1 operates to cool the cooling water passed through the engine 120 and of which temperature exceeds the threshold Te2, by the undercover cooling water passage 23 and the radiator 34.

On the other hand, FIG. 4 illustrates a state after the traveling speed V of the vehicle 100 becomes constant at a value between the threshold V1 and a threshold V2 which is below the threshold V1 within a short period of time (e.g., one minute) from the start of the engine 120. Here, the threshold V2 is one example of a "second speed threshold" according to the present disclosure.

Operations of the pump 31, the first valve 321, and the second valve 322 accompanying the rise in the temperature Te of the cooling water illustrated in FIG. 4, are substantially the same as those illustrated in FIG. 3. FIG. 4 is different from FIG. 3 in operation of the grille shutter 4.

For example, in the operation illustrated in FIG. 4, the grille shutter 4 opens the grille 111 at a time point t21 when the temperature Te of the cooling water exceeds the threshold Te1. The effective opening area of the grille 111 here is determined based on the temperature Te of the cooling water. Thus, the cooling water flowing through the undercover cooling water passage 23 is cooled by exchanging heat with air reached above the undercover 140 and air flowing below the undercover 140.

Further, at a time point t22 when the temperature Te of the cooling water exceeds the threshold Te2, the grille shutter 4 further opens the grille 111. Here, the effective opening area of the grille 111 is also determined based on the temperature Te of the cooling water. Thus, the flow rate of the air flowed in from the grille 111 and reached above the undercover 140 is increased, and the cooling of the cooling water in the undercover cooling water passage 23 is stimulated.

<Processing Executed by Controller>

Figure 5:
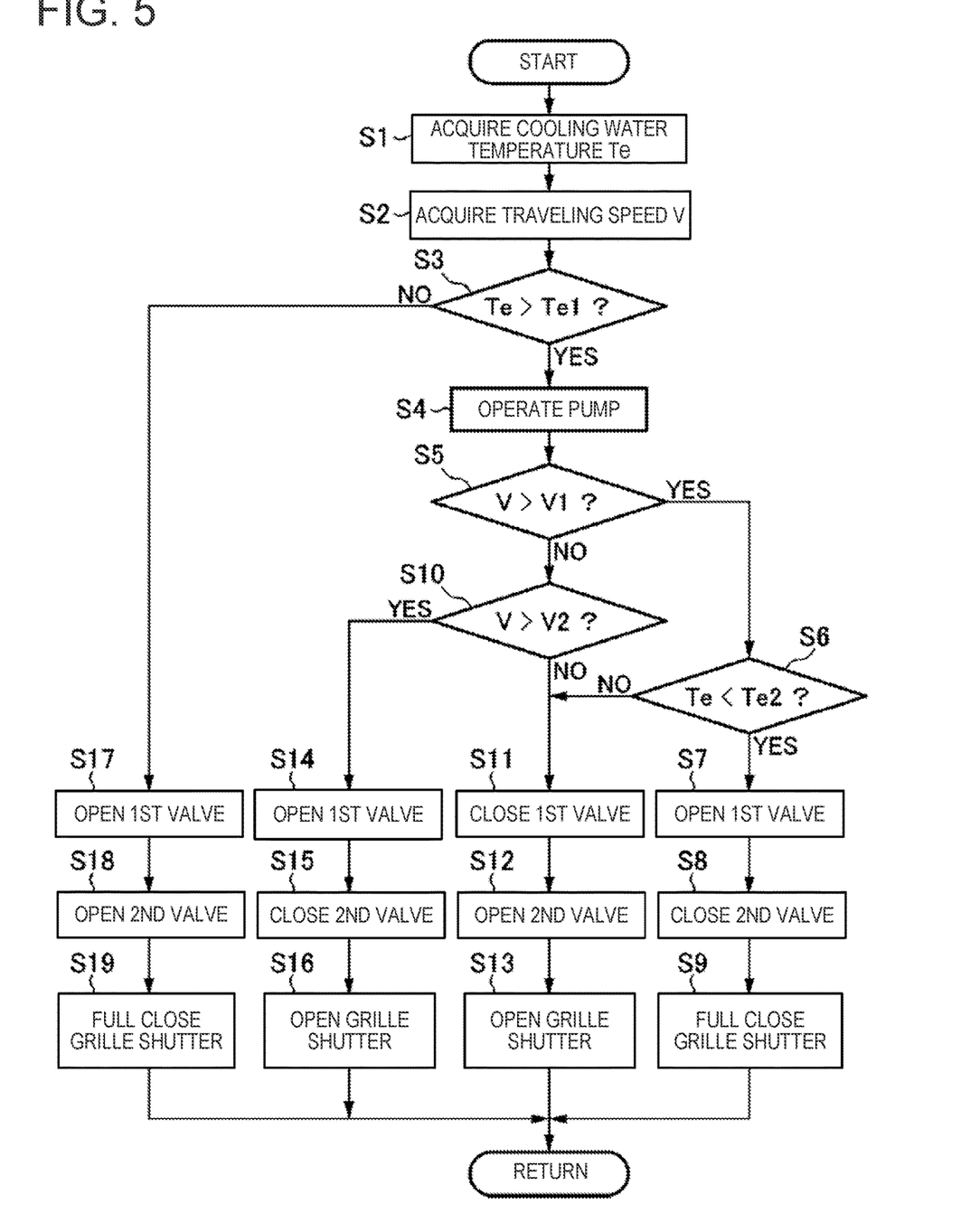
FIG. 5 is a flowchart illustrating processing executed by the controller.

Next, processing executed by the controller 6 is described with reference to FIGS. 1 and 5. FIG. 5 is a flowchart illustrating the processing executed by the controller 6.

First, the controller 6 acquires various information based on the detection signal at Steps S1 and S2 illustrated in FIG. 5. For example, at Step S1, the controller 6 acquires the temperature Te of the cooling water at a position downstream of the engine 120 and upstream of the undercover cooling water passage 23, based on the detection signal received from the temperature sensor 25. Moreover, at Step S2, the controller 6 acquires the traveling speed V of the vehicle 100 based on the detection signal received from the vehicle speed sensor 150.

At Step S3, the controller 6 determines whether the temperature Te of the cooling water is above the given threshold Te. The threshold Te1 is a reference value for determining whether the cooling water of the cooling system 1 is required to be cooled. When the temperature Te of the cooling water is above the threshold Te1, it can be determined that the cooling of the cooling water is necessary. If determined that the temperature Te of the cooling water is above the threshold Te1 (Step S3: YES), the controller 6 proceeds to Step S4.

At Step S4, the controller 6 operates the pump 31. Thus, the cooling water is discharged from the pump 31 to the supply passage 21 of the cooling water passage 2.

At Step S5, the controller 6 determines whether the traveling speed V of the vehicle 100 is above the given threshold V1. The threshold V1 is a reference value for determining an expected cooling performance of the undercover cooling water passage 23. When the traveling speed V is above the threshold V1, air flows below the undercover 140 at a high speed, therefore a relatively high cooling performance is expected from the undercover cooling water passage 23. If determined that the traveling speed V is above the threshold V1 (Step S5: YES), the controller 6 proceeds to Step S6.

At Step S6, the controller 6 determines whether the temperature Te of the cooling water is below the threshold Te2. The threshold Te2 is a reference value for determining whether the temperature of the cooling water is low enough to be cooled simply by the heat exchange with the air flowing below the undercover 140 (i.e., without using the heat exchange in the radiator 34 or the heat exchange with the air reached above the undercover 140). When the temperature Te is below the threshold Te2, the cooling water is determined as lower enough to be cooled simply by the heat exchange with the air flowing below the undercover 140. If determined that the temperature Te is below the threshold Te2 (Step S6: YES), the controller 6 proceeds to Step S7.

At Step S7, the controller 6 opens the first valve 321 and closes the second valve 322 at Step S8. Further, at Step S9, the controller 6 controls the shutter plates 41 of the grille shutter 4 to be located at the fully closed position G0. Thus, the cooling system 1 operates such that the cooling water is cooled by the heat exchange with the air flowing below the undercover 140 without supplying the cooling water to the radiator 34, as in a period from the time point t11 to the time point t12 illustrated in FIG. 3.

On the other hand, when the traveling speed V of the vehicle 100 is below the threshold V1, it is determined that the cooling water is difficult to be sufficiently cooled simply by exchanging the heat with the air flowing below the undercover 140. Therefore, if determined that the traveling speed V is below the threshold V1 (Step S5: NO), the controller 6 proceeds to Step S10.

At Step S10, the controller 6 determines whether the traveling speed V of the vehicle 100 is above the given threshold V2. The threshold V2 is a reference value for determining a cooling performance expected of the undercover cooling water passage 23. When the traveling speed V is above the threshold V2, a sufficient cooling performance is expected for the undercover cooling water passage 23 by the heat exchange with air flowing below the undercover 140 and with air reached above the undercover 140. If determined that the traveling speed V is above the threshold V2 (Step S10: YES), the controller 6 proceeds to Step S14.

At Step S14, the controller 6 opens the first valve 321 and closes the second valve 322 at Step S15. Further, the controller 6 opens the shutter plate 41 of the grille shutter 4 at Step S16. Here, the controller 6 increases the effective opening area of the grille 111 as the temperature Te of the cooling water rises. Thus, the cooling system 1 operates such that the cooling water is cooled by the heat exchange with the air flowing below the undercover 140 and the air reached above the undercover 140 without supplying the cooling water to the radiator 34, as in a period from the time point t21 to the time point t22 illustrated in FIG. 4.

On the other hand, when the temperature Te of the cooling water is above the threshold Te2, or when the traveling speed V of the vehicle 100 is below the threshold V2, it is determined that a sufficient cooling of the cooling water is difficult even by using the heat exchange with the air flowing below the undercover 140 and the air reached above the undercover 140. Therefore, if determined that the temperature Te is above the temperature Te2 (Step S6: NO), or if determined that the traveling speed V is determined as below the threshold V2 (Step S10: NO), the controller 6 proceeds to Step S11.

The controller 6 closes the first valve 321 at Step S11 and opens the second valve 322 at Step S12. Further, the controller 6 opens the shutter plate 41 of the grille shutter 4 at Step S13. Here, the controller 6 increases the effective opening area of the grille 111 as the temperature Te of the cooling water increases. Thus, the cooling system 1 operates such that the cooling water is cooled by the heat exchange with the air flowing below the undercover 140, the heat exchange with air reached above the undercover 140, and the heat exchange in the radiator 34 as from the time point t12 illustrated in FIG. 3 or from the time point t22 illustrated in FIG. 4.

On the other hand, when the temperature Te of the cooling water is below the threshold Te1, the temperature Te of the cooling water passing through the engine 120 is relatively low, and the need to cool the cooling water is determined as low. If determined that the temperature Te is below the threshold Te1 (Step S3: NO), the controller 6 proceeds to Step S17.

The controller 6 opens the first valve 321 at Step S17 and opens the second valve 322 at Step S18. Further, at Step S19, the controller 6 controls the shutter plate 41 of the grille shutter 4 to be located at the fully closed position G0. For this, the pump 31 of the cooling system 1 does not operate and the cooling water does not circulate in the cooling water passage 2, therefore the cooling water is not cooled.

<Effects>

According to the above configuration, when the temperature of the cooling water in the water jacket 120*a* in the engine 120 is above the threshold Te1 (temperature threshold), the controller 6 controls the pump 31, the first valve 321, and the second valve 322 (which are the flow rate adjuster) so that the flow rate of the cooling water supplied to the undercover cooling water passage 23 increases compared to when the temperature is below the threshold Te1 (temperature threshold). Thus, when the cooling water of the water jacket 120*a* in the engine 120 is at a high temperature, the cooling of the cooling water in the undercover cooling water passage 23 is stimulated. As a result, the engine 120 is effectively cooled without increasing the size of the grille 111 of the vehicle 100.

Further, the cooling system 1 includes the grille shutter 4 which is provided in the grille 111 of the vehicle 100 and changes the effective opening area of the grille 111. The undercover cooling water passage 23 cools the cooling water by exchanging heat with the air flowed into the engine bay 110 from the grille 111 of the vehicle 100 and reached above the undercover 140. The controller 6 acquires the traveling speed V of the vehicle 100 and, when the acquired traveling speed V is below the given threshold V1 (first speed threshold), controls the grille shutter 4 to bring the effective opening area of the grille 111 larger than when the acquired traveling speed V is above the threshold V1 (first speed threshold).

According to this configuration, in addition to the heat exchange with the air below the undercover 140, the heat exchange with the air flowing into the engine bay 110 from the grille 111 and reaching above the undercover 140 effectively cools the cooling water. Further, when the traveling speed V of the vehicle 100 is below the threshold V1 (first speed threshold), the controller 6 increases the flow rate of air reached above the undercover 140 by increasing the effective opening area of the grille 111 compared to when the acquired traveling speed V is above the threshold V1 (first speed threshold). As a result, cooling of the cooling water in the undercover cooling water passage 23 is stimulated, and therefore the engine 120 is effectively cooled.

Further, the cooling water passage 2 has the bypass passage 24 connecting the branching portion 21*a* disposed upstream of the radiator 34 and downstream of the undercover cooling water passage 23, to the merging portion 22*a* disposed downstream of the radiator 33 and upstream of the engine 120. The flow rate adjuster has the first and the second valves 321 and 322 (valve) which change the flow rate of the cooling water supplied from the branching portion 21*a* to the bypass passage 24. When the acquired traveling speed V is between the threshold V1 (first speed threshold) and the threshold V2 (second speed threshold) which is below the threshold V1 (first speed threshold), the controller 6 controls the first and the second valves 321 and 322 (valve) to bring the flow rate of the cooling water supplied from the branching portion 21*a* to the bypass passage 24 higher compared to when the acquired traveling speed V is below the threshold V2 (second speed threshold).

According to this configuration, when the traveling speed V of the vehicle 100 is between the threshold V1 (first speed threshold) and the threshold V2 (second speed threshold), the flow rate of the cooling water circulating in the path bypassing the radiator 34 is increased compared to when the traveling speed V of the vehicle 100 is below the threshold V2 (second speed threshold), the flow rate of the cooling water supplied from the branching portion 21a to the radiator 34 is reduced. Thus, the resistance received by the cooling water is reduced, and therefore the flow rate of the cooling water supplied to the undercover cooling water passage 23 is increased. As a result, the cooling of the cooling water in the undercover cooling water passage 23 is stimulated, and thus the need to cool the cooling water in the radiator 34 decreases. Therefore, the grille shutter 4 reduces the effective opening area of the grille 111 and also reduces the air resistance.

Second Embodiment

Figure 6:
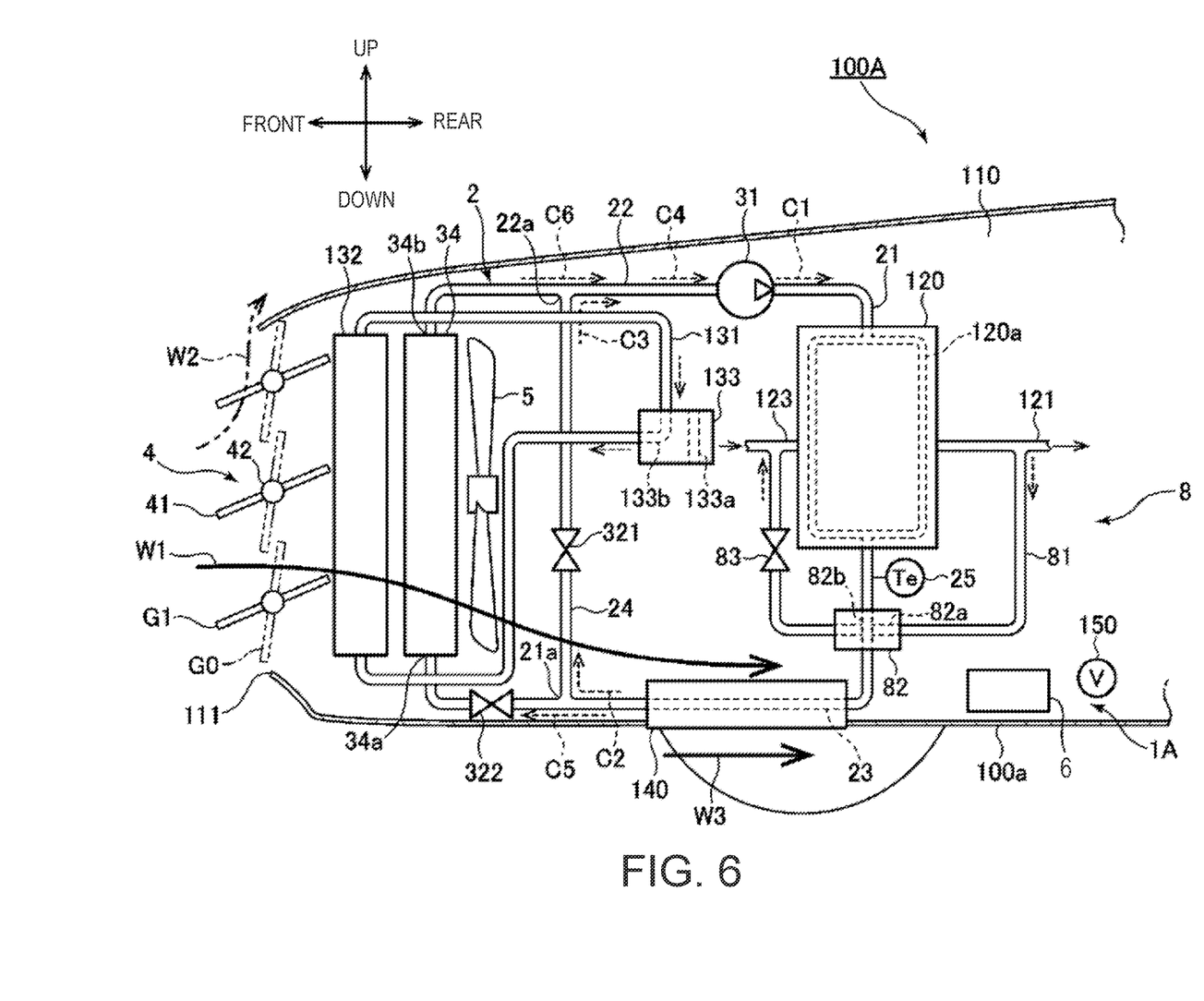
FIG. 6 is a schematic view of a vehicle on which a cooling system according to a second embodiment is mounted.

Next, the cooling system 1A according to the second embodiment is described with reference to FIG. 6. The cooling system 1A cools air used in an exhaust gas recirculation (EGR) system 8 mounted on a vehicle 100A in addition to the air used in the engine 120. Parts of a configuration of the cooling system 1A having the same components as those of the first embodiment are denoted with the same reference numerals, and the description thereof is suitably omitted. FIG. 6 is a schematic view of the vehicle 100A on which the cooling system 1A is mounted.
<EGR System>

The EGR system 8 is mounted on the vehicle 100A in order to prevent generation of nitrogen oxides in the engine 120 and knocking. The EGR system 8 includes an EGR gas passage 81, an EGR cooler 82, and an EGR valve 83.

The EGR gas passage 81 connects an exhaust duct 121 and an intake duct 123. High-temperature gas discharged from the engine 120 to the exhaust duct 121 partially flows through the EGR gas passage 81 and is guided to the intake duct 123.

The EGR cooler 82 and the EGR valve 83 are provided in the EGR gas passage 81. The EGR cooler 82 is formed therein with a passage 82a through which gas flows and a passage 82b through which cooling water flows. The gas flowing through the EGR gas passage 81, when flowing through the passage 82a, is cooled by exchanging heat with the cooling water flowing through the passage 82b after passing through the engine 120. The EGR valve 83 adjusts a flow rate of gas through the EGR gas passage 81 according to the state of the engine 120.
<Cooling System Configuration>

As described above, the cooling water used in the cooling system 1A is used not only for cooling the engine 120 but also for cooling the gas of the EGR system 8. The cooling water having a high temperature due to the heat exchange with the engine 120 and the gas are cooled by exchanging heat with air in the undercover cooling water passage 23 and the radiator 34.
<Effects>

According to the above configuration, the cooling water for cooling the engine 120 is also used to cool the gas of the EGR system 8. As a result, the configuration comprised of the cooling system 1A and the EGR system 8 are made compact.

The above embodiments are for facilitating the understanding of the present disclosure, and are not for limiting the interpretation of the present disclosure. Each element included in each embodiment, its arrangement, material, condition, shape, size, etc. are not limited to those illustratively described, and are suitably changeable.

In the above embodiments, the undercover cooling water passage 23 is formed inside the undercover 140. However, the present disclosure is not limited to this mode. For example, a pipe may be arranged to be in contact with an upper surface of the undercover 140 and a passage in the pipe may be used as the undercover cooling water passage. That is, the undercover cooling water passage may adopt any of various modes as long as its heat is exchangeable with air through the undercover 140.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1, 1A Cooling System
2 Cooling Water Passage
21a Branching Portion
22a Merging Portion
23 Undercover Cooling Water Passage
24 Bypass Passage
31 Pump (Flow Rate Adjuster)
321 First Valve (Flow Rate Adjuster, Valve)
322 Second Valve (Flow Rate Adjuster, Valve)
34 Radiator
4 Grille Shutter
6 Controller
100, 100A Vehicle
100a Bottom Surface
110 Engine Bay
111 Grille
120 Engine
120a Water Jacket
140 Undercover

What is claimed is:

1. A cooling system configured to cool an engine of a vehicle, the cooling system comprising:
a cooling water passage through which cooling water is supplied to a water jacket formed in the engine, and having an undercover cooling water passage provided in an undercover forming a bottom surface of the vehicle and where the cooling water is cooled by exchanging heat with air flowing below the vehicle;
a radiator provided in the cooling water passage and configured to cool the cooling water by exchanging heat with air flowing into an engine bay from a grille that is an opening portion formed at a front end of the vehicle;
a flow rate adjuster including a pump or valve, configured to adjust a flow rate of the cooling water supplied to the undercover cooling water passage; and
a controller configured to control the flow rate adjuster, the controller acquiring a temperature of the cooling water of the water jacket in the engine and, when the acquired temperature is above a temperature threshold, controlling the flow rate adjuster to increase the flow rate of the cooling water supplied to the undercover cooling water passage compared to when the acquired temperature is below the temperature threshold.

2. The cooling system of claim 1, further comprising a grille shutter provided to the grille and configured to change an effective opening area of the grille, wherein the undercover cooling water passage cools the cooling water by exchanging heat with air flowing into the engine bay from the grille and reaching above the undercover, and wherein the controller acquires a traveling speed of the vehicle and, when the traveling speed is below a given first speed threshold, controls the grille shutter to increase the effective opening area of the grille compared to when the acquired traveling speed is above the first speed threshold.

3. The cooling system of claim 2, wherein the cooling water passage has a bypass passage connecting a branching portion disposed at a position upstream of the radiator and downstream of the undercover cooling water passage, to a merging portion disposed at a position downstream of the radiator and upstream of the engine, wherein the flow rate adjuster includes the valve which is configured to change the flow rate of the cooling water supplied from the branching portion to the bypass passage, and wherein, when the acquired traveling speed is below the first speed threshold and above a given second speed threshold that is below the first speed threshold, the controller controls the valve to increase the flow rate of the cooling water supplied from the branching portion to the bypass passage compared to when the acquired traveling speed is below the second speed threshold.

4. The cooling system of claim 1, wherein the cooling water is cooled by exchanging heat with air flowing above and below the undercover.

5. A method of cooling an engine of a vehicle, the vehicle being mounted thereon with a cooling system having a cooling water passage through which cooling water is supplied to a water jacket formed in the engine, and having an undercover cooling water passage provided in an undercover forming a bottom surface of the vehicle and where the cooling water is cooled by exchanging heat with air flowing below the vehicle, and a radiator provided in the cooling water passage and configured to cool the cooling water by exchanging heat with air flowing into an engine bay from a grille that is an opening portion formed at a front end of the vehicle, the method comprising:

acquiring a temperature of the cooling water in the water jacket; and increasing, when the acquired temperature is above a given temperature threshold, a flow rate of the cooling water supplied to the undercover cooling water passage compared to when the acquired temperature is below the temperature threshold.

* * * * *